Oct. 14, 1969     G. G. SOUTHWICK     3,472,568
CONTAINER

Filed April 10, 1967     2 Sheets-Sheet 1

INVENTOR
GILBERT G. SOUTHWICK
BY
Robert D. O'Brien
ATTORNEY

Oct. 14, 1969

G. G. SOUTHWICK 3,472,568

CONTAINER

Filed April 10, 1967

INVENTOR
GILBERT G. SOUTHWICK
BY
Robert D. O'Brien
ATTORNEY

United States Patent Office 3,472,568
Patented Oct. 14, 1969

3,472,568
CONTAINER
Gilbert G. Southwick, R.D. 2, Maxim Drive,
Andover, N.J. 07821
Filed Apr. 10, 1967, Ser. No. 629,549
Int. Cl. B65d *81/38;* A47j *41/02;* A45f *3/16*
U.S. Cl. 312—31     3 Claims

ABSTRACT OF THE DISCLOSURE

This invention relates to a container and most particularly to a fiber container having an inner insulating sleeve to give the container maximum flexibility against temperature change from the interior of the container to the exterior atmosphere.

---

This invention relates to containers and more particularly to a container possessing heat insulating qualities and adopted to receive therein an independent vessel.

This invention further relates to a container possessing maximum flexibility as to use and strength coupled with a low cost of manufacture.

It has been well known in the container industry to provide a container having a hard outer shell capable of receiving graphics with an inner receptacle, often glass, to hold various substances. Further there was provided a heat insulating layer of material that would allow the inner receptacle to receive and retain temperature control over either warm or cold substances.

Originally and still today one of the most common and perhaps best known is the Thermos bottle consisting of a metal outer shell with a glass receptacle suspended therein. While for many purposes this container has proven satisfactory, it has not provided the best solution to all types of use. Because of its construction, it is relatively expensive to manufacture. Also because of its glass receptacle inside, it has all of the deficiencies of glass such as breakage.

The need today in the field of thermal containers is for a simple container which broadly would have the following characteristics:

(1) good thermal qualities
(2) sturdy to resist the rigors of repeated handling both in commercial shipment and personal use
(3) flexibility—having easy removal or substitution of the inner receptacle as demanded by variations of use
(4) reduced cost of manufacture so as to make it available for the widest use by all who need the benefits of heat retention or elimination
(5) humidity resistant so as to resist inroads of dampness to further gain important advantages to the user
(6) capable of receiving all types of graphics to its outer shell to again give maximum flexibility
(7) control the total weight so as to reduce shipment costs so that cost advantages, by reason of weight, can be acquired without loss of strength or at increased cost of composition or manufacture Because of the demand for a container of this type, there has been many proposed solutions. As disclosed in Durkin 3,070,281 an inner paper tube is surrounded by a series of paper plies which are themselves by a layer of resilient compressible material which could be Mylar polyethylene or the like. This tube, however, was intended as an open ended wrap and while adequate for that purpose did not reach the solution to which my invention is directed.

Gattuso 2,695,744 illustrates another solution which was to provide a metal foil inner liner suspended by an insulating air space from the exterior cardboard shell. Again, however, the use of metal substantially increases the cost and also while an air space is a well recognized insulating layer, it cannot match in thermal qualities other material of a more specific nature.

This use of a dead air space was further used in Lockwood 2,353,678 where an insulating top and bottom member incorporating this insulation via air was included to gain all over heat retention.

Other proposed solutions such as Hlavaty 2,301,657 and Lorwin 1,121,072 have proposed the use of insulating material to be placed within the spaced walls of the container.

It has also been proposed in Southwell 2,849,144 to form the receptacle itself of polyethylene or polystyrene and to surround it with common cardboard capable of receiving a label or graphics.

Thus, the prior art has presented many solutions to the problem and each proposed solution has contributed greatly to the state of the container art.

It is therefore a principal object of my invention to provide an improved container to maintain maximum humidity and temperature control over its contents while retaining broad flexibility of substitution in combination with minimum cost.

It is a further object of my invention to provide a fully insulated container resistant to breakage in use yet formed of material giving maximum weight for shipment.

This invention further contemplates a simple and inexpensive process of manufacture which can utilize readily available materials and which may be formed using present day conventional equipment either for spiral or convolute wound containers.

In general the object of this invention and related objects are accomplished by providing a container having an inner insulating layer, in frictional engagement with a removable inner receptacle, the insulating layer being surrounded and bound intimately to a hard exterior shell with a metalic bottom seamed thereto and with ad etachable top. Additional insulating at the top and bottom being provided so as to form a substantially air tight and thermal seal to protect the inner receptacle.

The novel features which are believed to be characteristics of my invention are set forth in the appended claims. The invention itself may be best understood by reference to the following description, taken in conjunction with the accompanying drawings in which:

Figure 1:
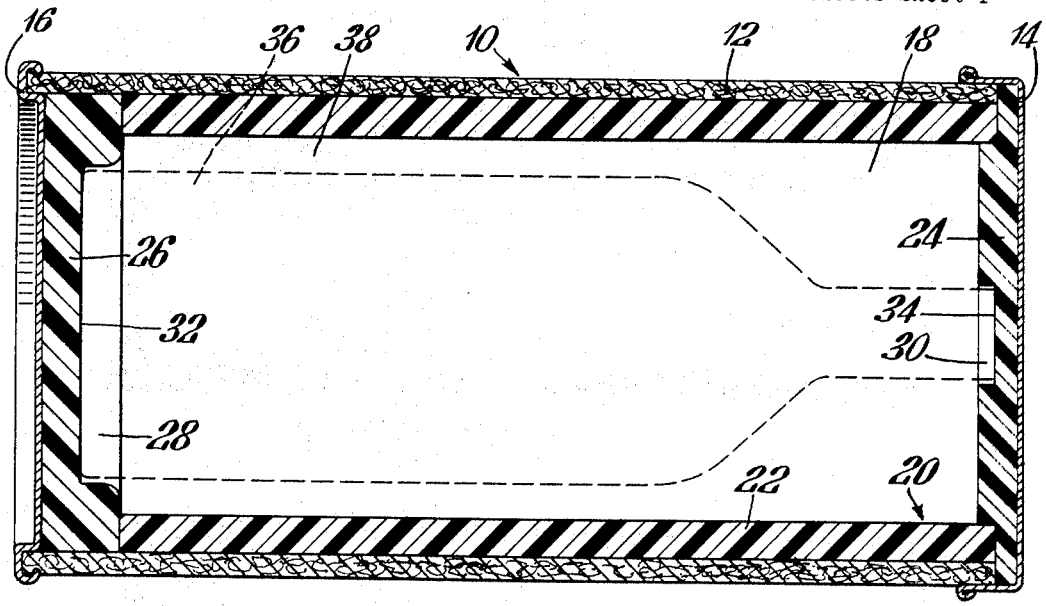
FIG. 1 is a sectional view of the container of this invention.

Referring now to FIG. 1, there is shown a container 10 having a cylindrical shape with a side wall 12, a top 14 and a bottom 16. The bottom 16 is securely fastened while the top 14 is removable. The side wall 12 is made of fiber while the top 14 and bottom 16 are made of a more durable material either metal or plastic. Within the hollow interior 18 of the container is a liner 20 or sleeve having a body 22, top 24 and bottom 26 made of a suitable insulating material. Any suitable means may be used to retain the top and bottom insulating portions immobile with respect to said insulating body. This can be done by rigidly fastening the insulation material to the top and bottom container portions, by using grooves or a plug type assembly to seat the top and bottom members relative to the insulating body portion or the like. One material found to be satisfactory is polystyrene.

The top and bottom are suitably formed with recesses 28 and 30 respectively that define a seat 32 and 34 to hold immobile and centrally a further container 36 or receptacle inserted within the sleeve 20. The shape of these recesses would be dependent upon the size and shape of the secondary container. Often it has been found desirable to provide an air space 38 between the exterior surface of the central container 36 around its sides and the adjacent interior surface of the insulating material.

When the container 10 is fully assembled and the secondary receptacle 36 inserted, the container 10 by reason of its insulation has been found to achieve unique temperature stability in the liquid contained within the secondary receptacle. Basically water placed in the secondary receptacle at 40° Fahrenheit, took over 13 hours to reach room temperature as compared to 3 hours for water in a control container which was identical except without an insulating layer.

Thus by this container it is possible to achieve a more extensive storage period without temperature change for a confined liquid.

Figure 2:
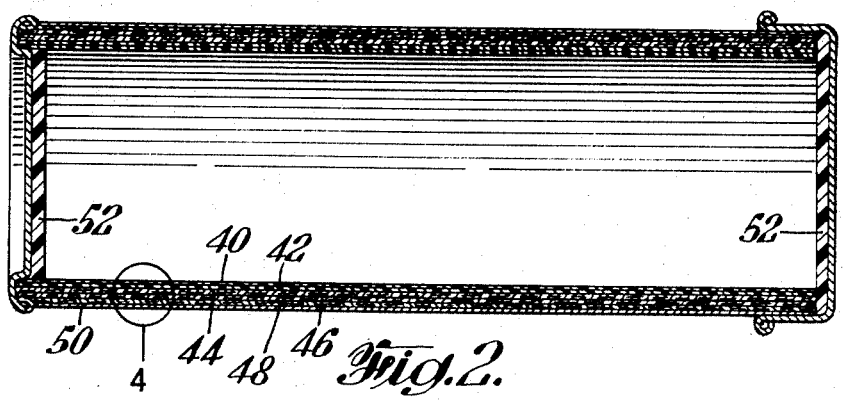
FIG. 2 is a sectional view of a modification of the invention.
Figure 4:
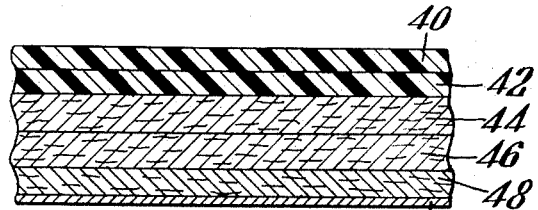
FIG. 4 is an enlarged fragmentary section of the portion of FIG. 2 indicated at 4.

Turning to FIG. 2, there is shown a spiral wound tube embodying the invention. The body in FIG. 4 consists of two inner layers 40, 42 of insulating material, two layers 44, 46 of chip board, one layer of kraft board 48 and a final outer layer 50 of foil laminate. The metal top and bottoms include insulating pads 52, the same as shown at 16 FIG. 1.

Figure 3:
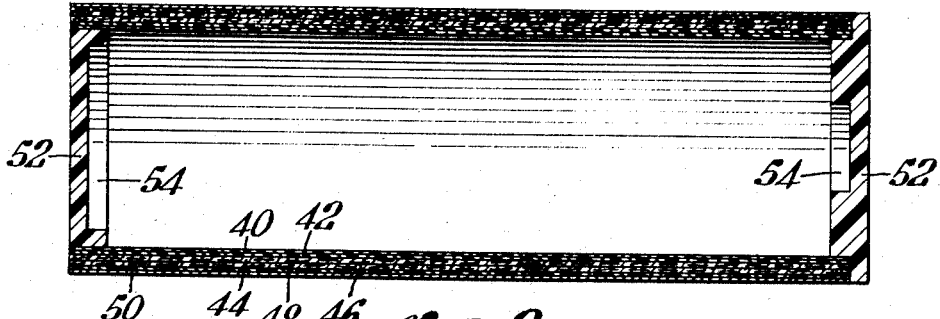
FIG. 3 is a sectional view of a further modification of the invention.

In FIG. 3 there is shown the insulating pads 52 cut out to form seating recesses 54 so as to receive a bottle of the shape of the secondary receptacle of FIG. 1.

Turning now to the modification of FIGS. 5 to 8, it is often important because of the nature of the product to be retained within the temperature controlled atmosphere to likewise provide for an equivalent control of the humidity conditions.

Figure 5:
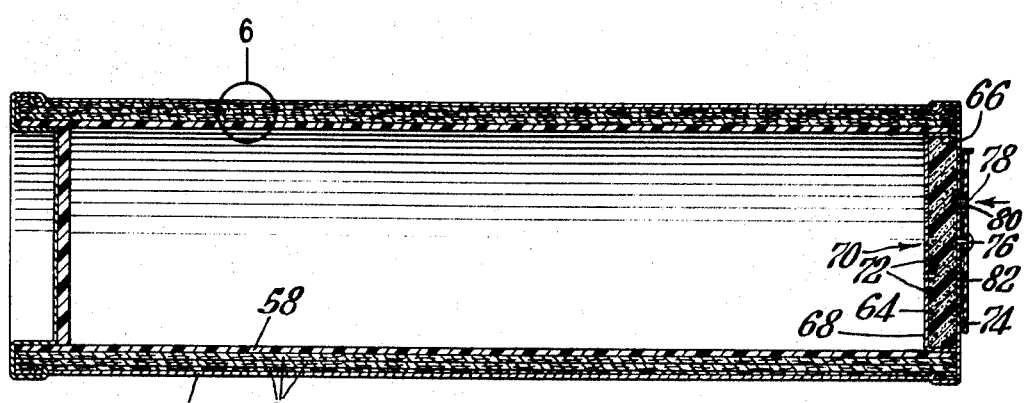
FIG. 5 is a sectional view of a further modification of the invention.
Figure 6:
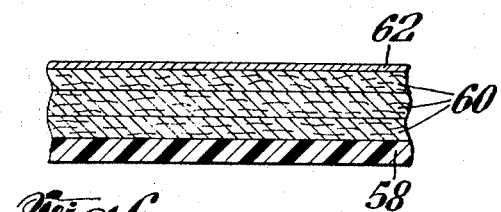
FIG. 6 is an enlarged fragmentary section of the portion of FIG. 5 indicated at 6.
Figure 8:
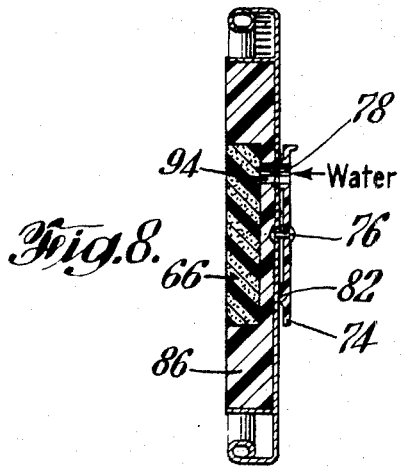
FIG. 8 is a sectional view taken along line 8—8 of FIG. 7.
Figure 7:
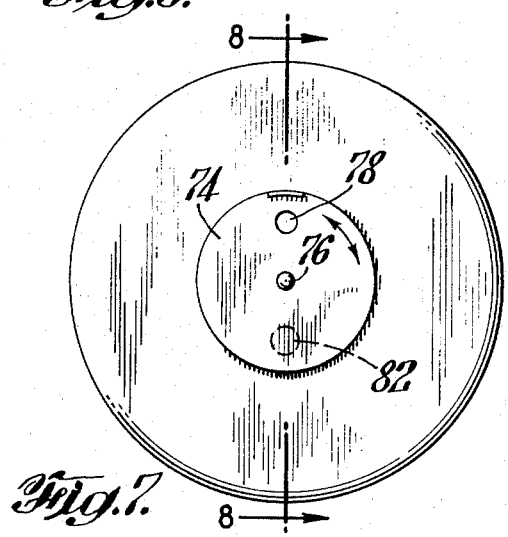
FIG. 7 is a top view of the container of FIG. 5.

In FIGS. 5 and 6 there is shown a spiral wound container having a body, top and bottom. The body has an inner layer 58 of 010 polystyrene or other impervious insulating material, three layers 60 of .016 chip board and an exterior layer 62 of .003 laminated foil. The bottom is rigidly attached to the body and has an inner insulating pad.

The top shown in FIG. 5 adapted to fit over the top extremity of the container at 7 has a plate 64 which forms or defines an interior. This interior is filled with a sponge material 66 and the exterior section 68 of the plate at substantially the center portion is perforated at 70 by a number of openings 72 as necessary and desirable to allow for a controlled escape of the water vapor from the sponge into the interior of the container. A rotatable disk 74 is held to the exposed exterior surface of this top by means of a rivet 76. The disk 74 has a large opening 78 which when the disk is rotated to its proper position rests directly over a corresponding opening 80 in the top so that water can be poured on the sponge. When the disk is rotated to its closed position, the lug 82 is seated in the opening 78 to seal the opening and thus preventing evaporation of the water and prevent further rotation of the disk.

What is claimed is:

1. A container adapted to receive within its hollow interior a removable receptacle, including the combination of a removable top member, a bottom member, and a hollow body member, said body member composed of a plurality of individual layers, at least the interior layer being formed of an insulating material, said top and said bottom members including an insulating layer on their inner surface adapted to form a unitary insulating surface when said top member and said bottom member are attached to said body member, means for positioning the removable receptacle within the hollow interior of said body member fixedly relative to said top and said bottom members, means for controlling the humidity within the interior of said container, said humidity control means including a water absorbing material inserted into a recess in the top insulating layer, means for introducing water into the water absorbing material, means to allow vapors to escape from the water absorbing material at a controlled rate into the interior of the container, and means to seal the opening in said water introducing means to prevent air from seeping into the interior of the container, said body member including an inner layer of insulating material, a plurality of intermediate layers of fiber chip board and an exterior layer of laminated foil.

2. A container adapted to receive within its hollow interior a removable receptacle, including the combination of a removable top member, a bottom member, and a hollow body member, said body member composed of a plurality of individual layers, at least the interior layer being formed of an insulating material, said top and said bottom members including an insulating layer on their inner surface adapted to form a unitary insulating surface when said top member and said bottom member are attached to said body member, means for positioning the removable receptacle within the hollow interior of said body member fixedly relative to said top and said bottom members, means for controlling the humidity within the interior of said container, said humidity control means including a water absorbing material inserted into a recess in the top insulating layer, means for introducing water into the water absorbing material at a controlled rate into the interior of the container, and means to seal the opening in said water introducing means to prevent air from seeping into the interior of the container, said body member including an inner layer of .010 polystyrene, a plurality of intermediate layers of fiber chip board and an exterior layer of .003 laminated foil.

3. A container as defined in claim 2, wherein said intermediate layers are comprised of .016 chip board.

References Cited

UNITED STATES PATENTS

| 857,218 | 6/1907 | Tisch | 312—31.2 |
| 2,202,796 | 5/1940 | Hermani | 312—31.1 |
| 2,283,867 | 5/1942 | Florsdorf et al. | 312—31 |
| 2,837,232 | 6/1958 | Rossi | 215—13 |
| 3,096,897 | 7/1963 | Hansen | 215—13 |

FOREIGN PATENTS 316,683  12/1956  Switzerland.

CASMIR A. NUNBERG, Primary Examiner

U.S. Cl. X.R.

220—17